United States Patent

Furuhashi

[11] Patent Number: 5,933,227
[45] Date of Patent: Aug. 3, 1999

[54] TESTING METHOD FOR OPTICAL FIBER

[75] Inventor: Masaaki Furuhashi, Tokyo, Japan

[73] Assignee: Ando Electric Co., Ltd., Tokyo, Japan

[21] Appl. No.: 09/049,437

[22] Filed: Mar. 27, 1998

[30] Foreign Application Priority Data

Mar. 31, 1997 [JP] Japan .................................. 9-081426

[51] Int. Cl.$^6$ .................................................. G01N 21/00
[52] U.S. Cl. ............................................................. 356/73.1
[58] Field of Search ............................... 356/73.1, 32, 33, 356/34, 35; 250/227.14, 227.15

[56] References Cited

U.S. PATENT DOCUMENTS 5,731,869  3/1998  Minami .................................. 356/73.1

FOREIGN PATENT DOCUMENTS

9-018428  1/1997  Japan .

*Primary Examiner*—Hoa Q. Pham
*Assistant Examiner*—Tu T. Nguyen
*Attorney, Agent, or Firm*—Fish & Richardson P.C.

[57] ABSTRACT

A testing method for an optical fiber is disclosed which is able to measure a loss distribution and a loss at a connection point based on a received first light signal waveform. The method comprises a step of extracting and storing the duration of the first light signal waveform when the difference of the level between the start and the end of the waveform from the specified starting point exceeds the specified criterion, a step of generating a second light signal waveform by adding the fixed values corresponding to each of the duration of the extracting result mentioned above, a step of judging if a value of connection loss calculated using the first light signal waveform exceeds the specified criterion and a step of decision of a point exceeding the criterion specified above is a discontinuous point existing in the optical fiber to be tested.

7 Claims, 9 Drawing Sheets

TESTING METHOD FOR OPTICAL FIBER

BACKGROUND OF THE INVENTION

1. Field of the Invention

The present invention relates to a testing method for an optical fiber, which detects problems in the optical fiber based on the light pulse reflected by the optical fiber line.

This application is based on patent application No. Hei 09-081426 filed in Japan, the content of which is incorporated herein by reference.

2. Description of Related Art

OTDR (Optical Time Domain Reflectometry) is a method which measures the loss of connection or detects a trouble point in an optical fiber to be tested, by sending the light pulse to the optical fiber and detecting the returning light.

Figure 7:
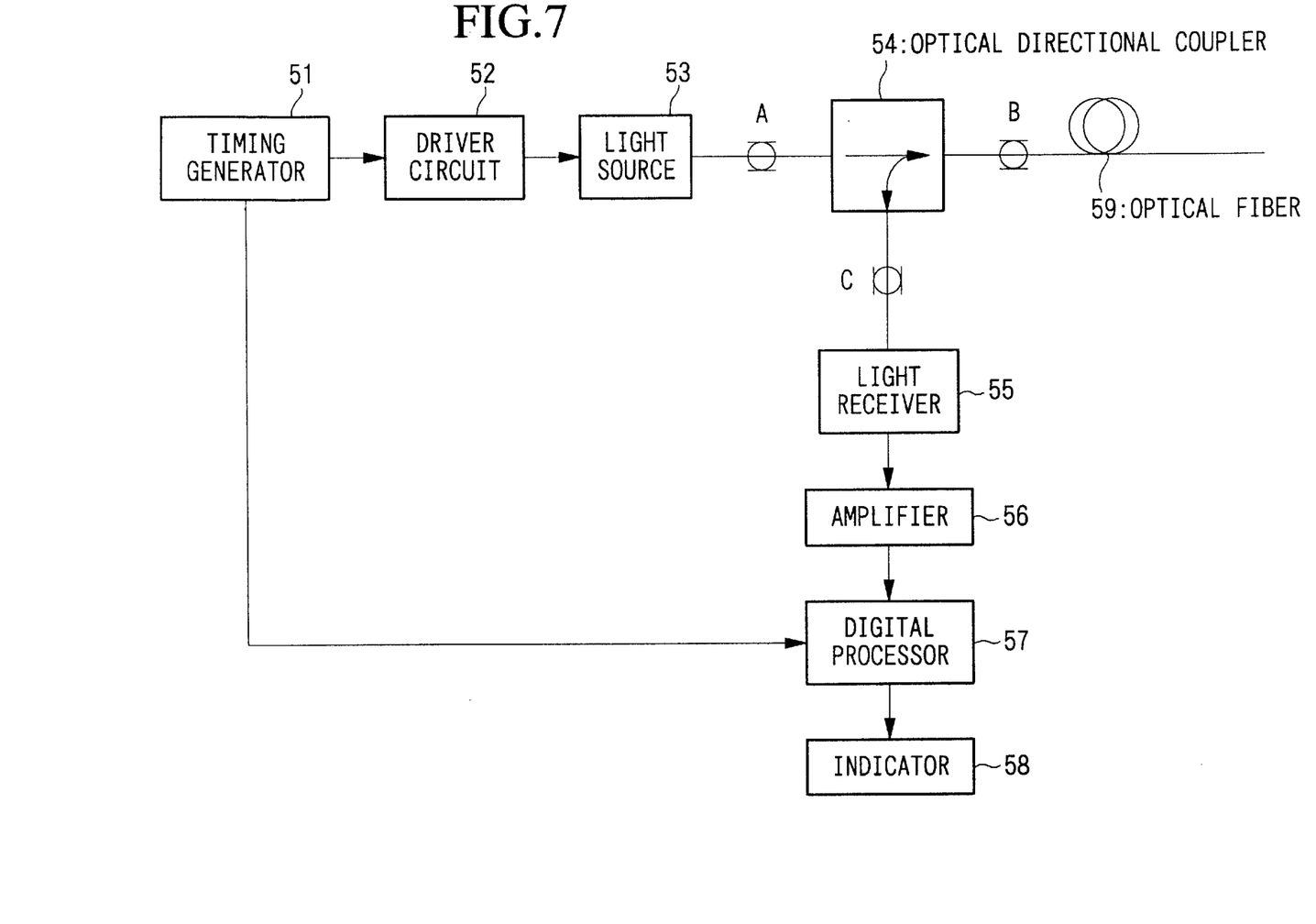
FIG. 7 is a block diagram showing a sample of conventional OTDR construction.

FIG. 7 is a block diagram showing an apparatus using a conventional OTDR construction. The apparatus contains a timing generator 51 which determines the timing of generation of a light pulse, driver circuit 52, light source 53 which outputs the light pulse synchronizing with the signal generated by the timing generator 51, optical directional coupler 54 at which incident light from A goes out of B to the optical fiber 59 to be tested and incident light from the optical fiber 59 through B goes out of C. The apparatus also contains a light receiver 55 which converts the outgoing light from the optical directional coupler 54 to the electric signal and amplifier 56 which amplifies the electric signal output by the light receiver 55. The apparatus also contains a digital processor 57 which digitizes and processes the timing signal output by the timing generator 51, the electric signal is amplified by the amplifier 56, and the result is displayed on the indicator 58.

In the example shown in FIG. 7, the driver circuit 52 generates the pulse current based on the timing signals from the timing generator 51, causing the light source 53 to emit light. The light emitted by the light source 53 goes through the optical directional coupler 54 and enters the optical fiber 59 to be tested.

Backscattered light or light returning by reflection is transmitted to the light receiver 55 via the optical directional coupler 54. The lights are converted into electrical signals and are amplified by the amplifier 56. The backscattered light returning from the optical fiber 59 to be tested is caused by Rayleigh scattering in the optical fiber 59.

The electrical signal amplified by the amplifier 56 is converted into a digital signal by the digital processor 57, and processes noise reduction such as equalization. Afterward, the above result is converted logarithmically and is displayed on the indicator 58.

Figure 8:
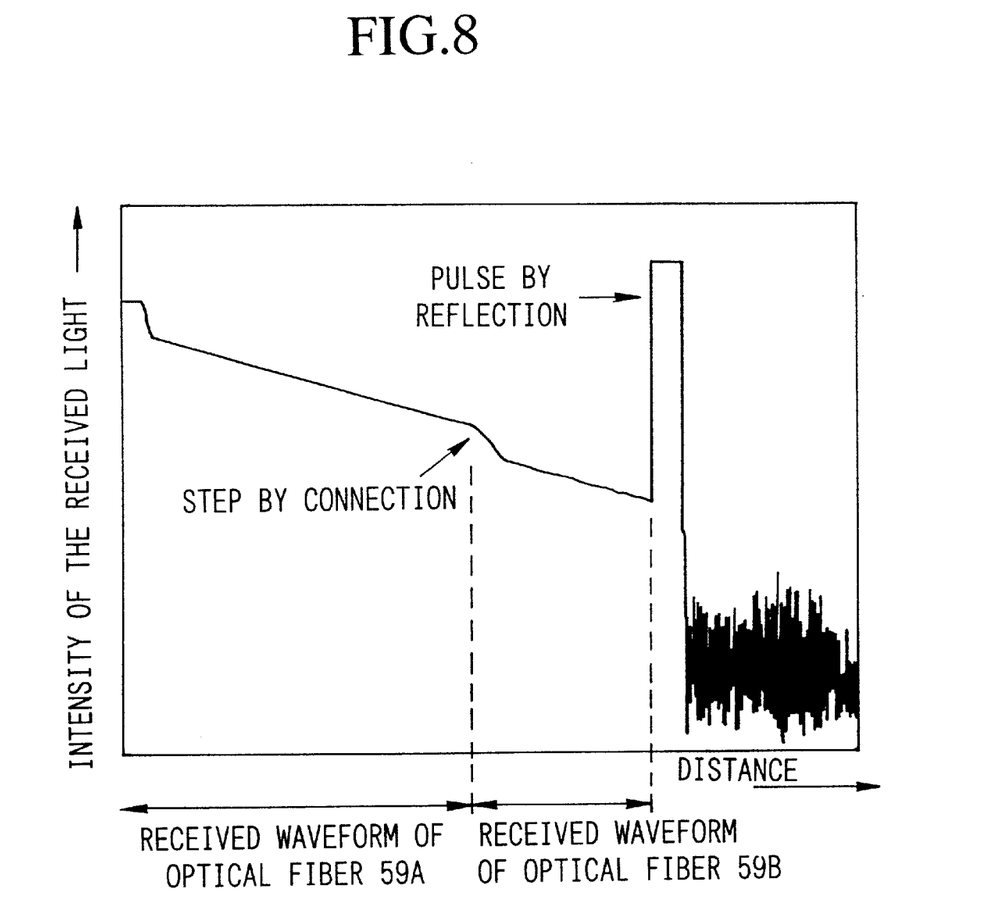
FIG. 8 is a graph of the result of measurement of the optical fiber 59 to be tested, of which optical fiber 59A and optical fiber 59B are serially connected by the composition shown in FIG. 7.

FIG. 8 shows a resulting waveform of measurement of optical fiber 59 to be tested which is serially connected to optical fiber 59A with optical fiber 59B using OTDR with a construction shown in FIG. 7.

In FIG. 8, the x-axis represents a distance (equal to the time after the light emitted by the light source 53 reaches the optical fiber 59 to be tested), and the y-axis represents the intensity of the received light.

As shown in FIG. 8, the line goes down linearly as the distance on the x-axis increases because the signal is logarithmically converted at the digital processor 57. Also in FIG. 8, the loss at the connection appears as a non-linear step on the curve, and the reflection by the connectors or terminations is observed as a large discontinuous upward waveform.

There is a problem in the conventional method in that a loss at a connection by fusion or a loss caused by a bend at a certain point in the optical fiber to be tested are observed as a non-linear step on the graph. Detecting a loss depends on finding the non-linear steps mentioned above; however, this is not easy since there are numerous waveforms from the optical fiber.

Figure 9:
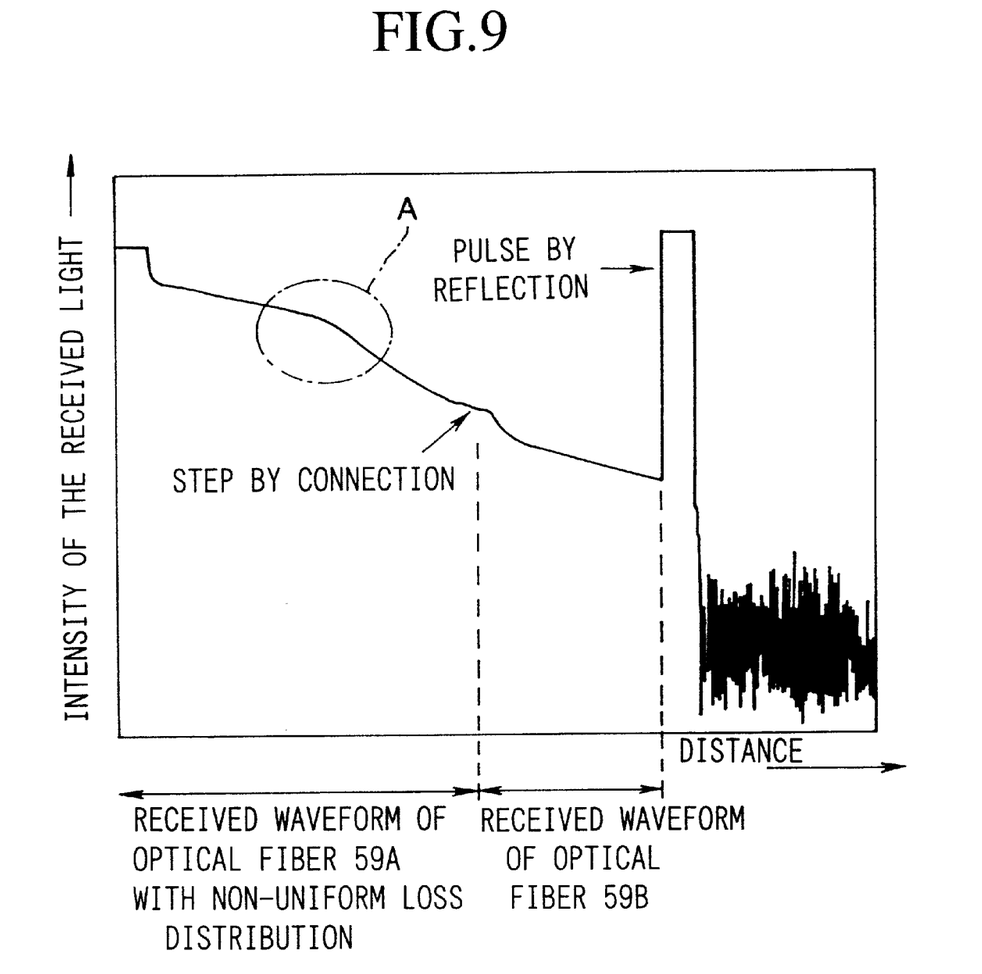
FIG. 9 is a graph of the observation of loss distribution of an optical fiber by the composition shown in FIG. 7.

FIG. 9 is a sample loss distribution of a optical fiber observed with an OTDR method. As shown in FIG. 9, the curve of the loss distribution does not generally show a constant smoothness because of non-uniformity in the longitudinal direction of the optical fiber. For example, it shows a characteristics curve enclosed by the dashed line.

In the ambiguous case such as is shown in FIG. 9, the existence of a non-linear step on the curve is found by a skilled observer.

However, the objectives of the methods mentioned above are to detect the connection point even if noise is superimposed on the curve of the signal, and are not for the purpose of detecting the connection point in the curve of loss distribution, which is observed as a non-uniform linear attenuation curve, in an optical fiber to be tested.

SUMMARY OF THE INVENTION

It is therefore an object of the present invention to provide a testing method for an optical fiber, which automatically detects a trouble point and measures the loss at the connection point using an OTDR method, even in the case when the loss distribution of the optical fiber is non-uniform and the measured curve is not linear after logarithmic conversion is performed on the change in level of the received signal.

In order to attain this object, the present invention provides a testing method for an optical fiber to measure a loss distribution and a loss at the connection point of optical fibers based upon a received first light signal waveform, comprising:

a step of extracting and storing the duration of the first light signal waveform when the difference of the level between the start and the end of the waveform from the specified starting point exceeds the specified criterion;

a step of generating a second light signal waveform by adding the fixed values corresponding to each of the duration of the extracting result mentioned above;

a step of judging if a value of connection loss calculated using the first light signal waveform exceeds the specified criterion; and a step of deciding whether a point exceeds the criterion specified above is a discontinuous point existing in the optical fiber to be tested.

DESCRIPTION OF PREFERRED EMBODIMENTS

Figure 1:
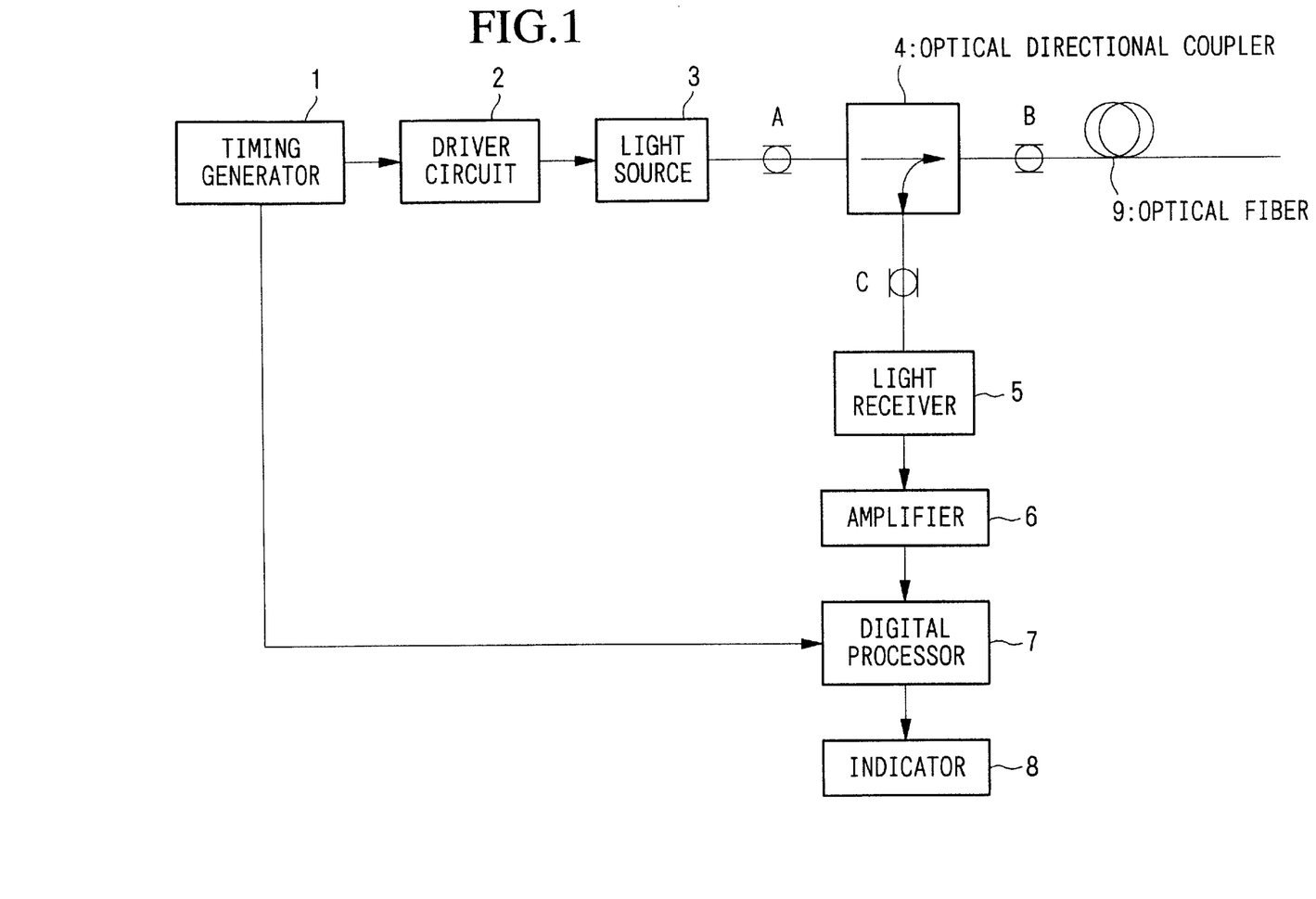
FIG. 1 is a block diagram illustrating a construction of OTDR being applied a testing method according to an embodiment of the present invention.

Hereinbelow, a testing method for an optical fiber according to an embodiment of the present invention will be described with reference to FIG. 1 which is a block diagram illustrating an OTDR construction being used for a testing method according to an embodiment of the present invention. In FIG. 1, a timing generator 1 determines the timing of optical pulse generation. A driving circuit 2 drives a light source 3, and the light source 3 outputs the optical pulse synchronized with a timing signal generated by the timing generator An optical directional coupler 4 allows a light going through path A to enter into an optical fiber 9 to be tested via path B. Also, incident light from the optical fiber 9 to be tested exits through path C. A light receiver 5 converts the light from path C of the optical directional coupler 4 into an electrical signal.

An amplifier 6 amplifies the electrical signal outputted by the light receiver 5. A digital processor 7 converts and processes both the timing signal outputted by the timing generator 1 and electrical signal amplified by the amplifier 6, and displays the result.

Figure 2:
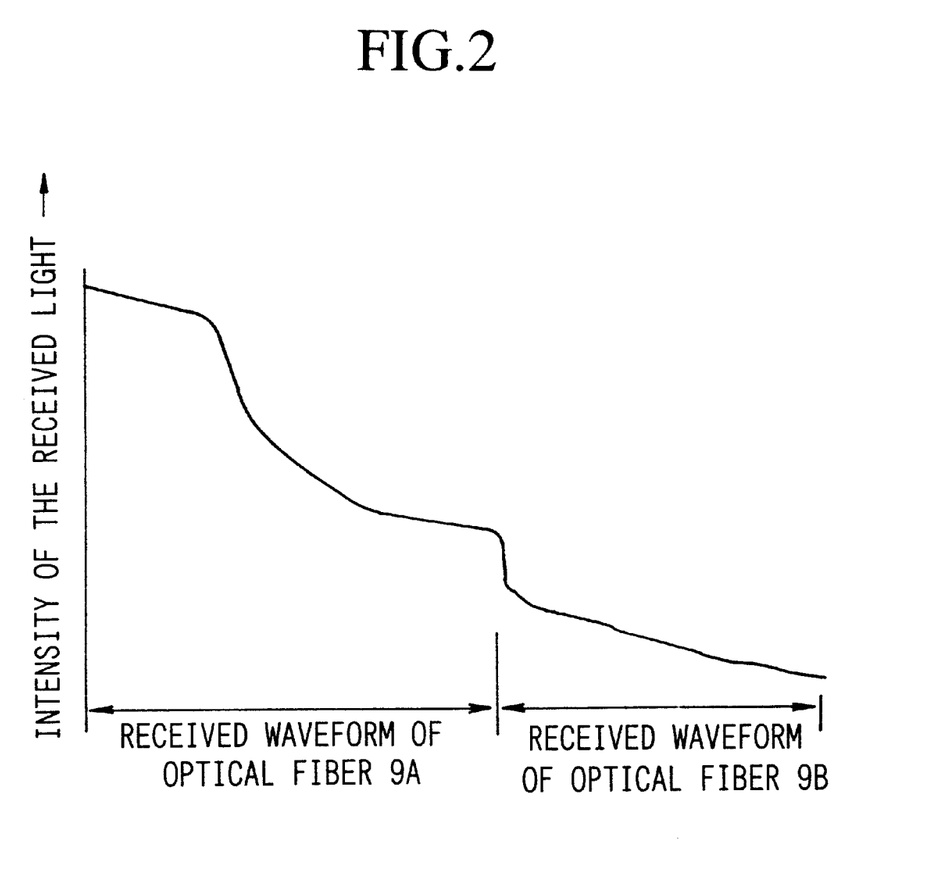
FIG. 2 represents a waveform of a measurement of the optical fiber 9 to be tested which is made of optical fiber 9A and optical fiber 9B connected in series.

FIG. 2 represents a waveform of a measurement of the optical fiber 9 to be tested which is made of optical fiber 9A and optical fiber 9B connected in series. In this FIG. 2, the x-axis is distance, and the y-axis is intensity of received light.

As shown in FIG. 2, the optical fiber 9 to be tested, which has a non-uniform loss distribution and waviness, is measured by OTDR in an embodiment of the present invention. Also, the optical fiber 9 to be tested is provided by connecting the optical fibers 9A and 9B. The waveform shows that the connection point is at the center on the graph of FIG. 2.

A loss caused by the connection is observed as a transition of the intensity of the received signal and appears as a non-linear step on the signal wave. However, the optical fiber 9A has a part with non-uniform loss distribution, which means there is a non-linear part because a distance has an unequal attenuation, and the signal in observed to be fluctuating at the point before the connection point, as shown on the left half side in FIG. 2.

Figure 3:
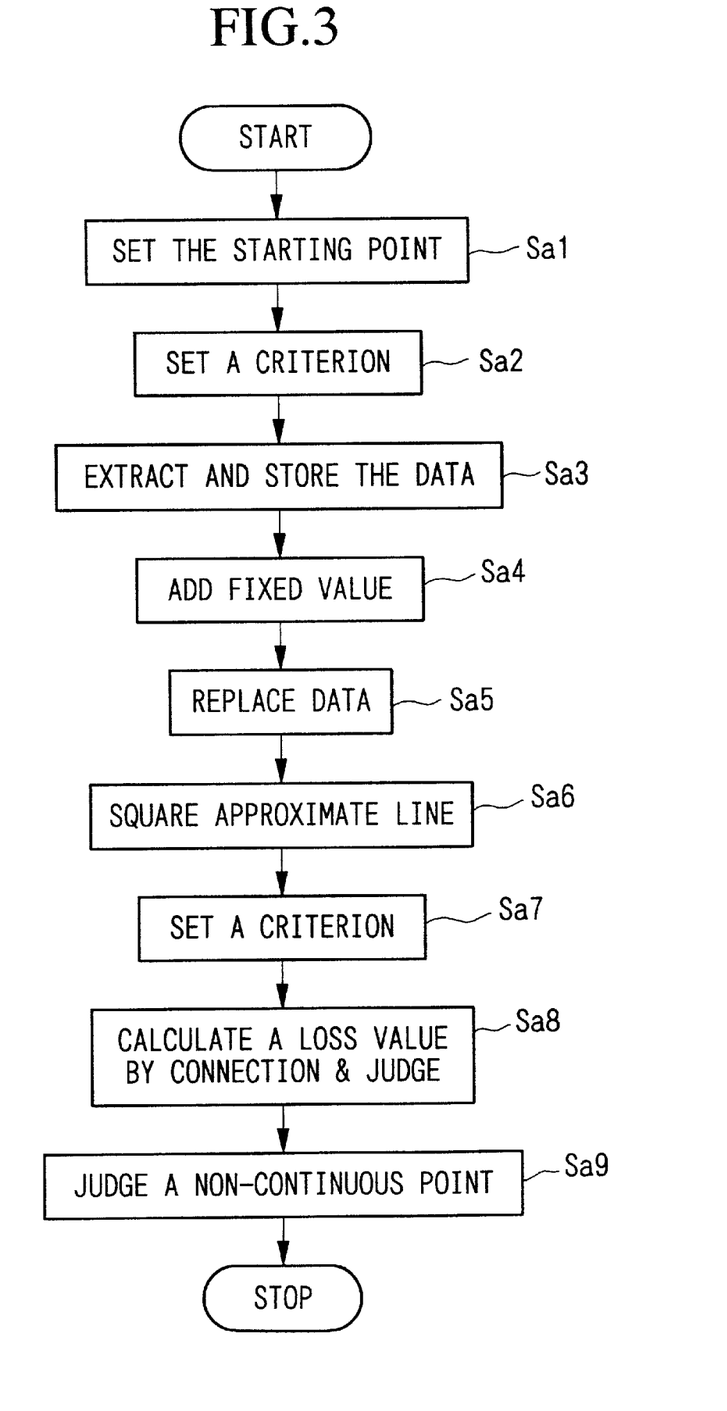
FIG. 3 is a flowchart showing a process by an embodiment of the present invention.

FIG. 3 is a flowchart showing a process of an embodiment of the present invention. First, in the embodiment of the present invention, the starting point of processing is set on the observed waveform such as in FIG. 2. The point is data point 1 (step Sa1). It means that a starting point of non-uniformity of loss distribution is detected and the point is set as the above mentioned starting point of processing.

Next, a criterion $\Delta y0$ is set for the changes of intensity of received signal at the data point on the signal waveform (step Sa2). This $\Delta y0$ is set smaller than the loss distribution at the point where measurement is performed.

For example, a case with larger loss than this criterion $\Delta y0$ must be measured if the loss is to be 0.2 dB as in the graph of FIG. 2. Therefore, the criterion is set smaller than above 0.2 dB; for example, $\Delta y0$ is set 0.1 dB in the embodiment of the present invention.

Figure 4:
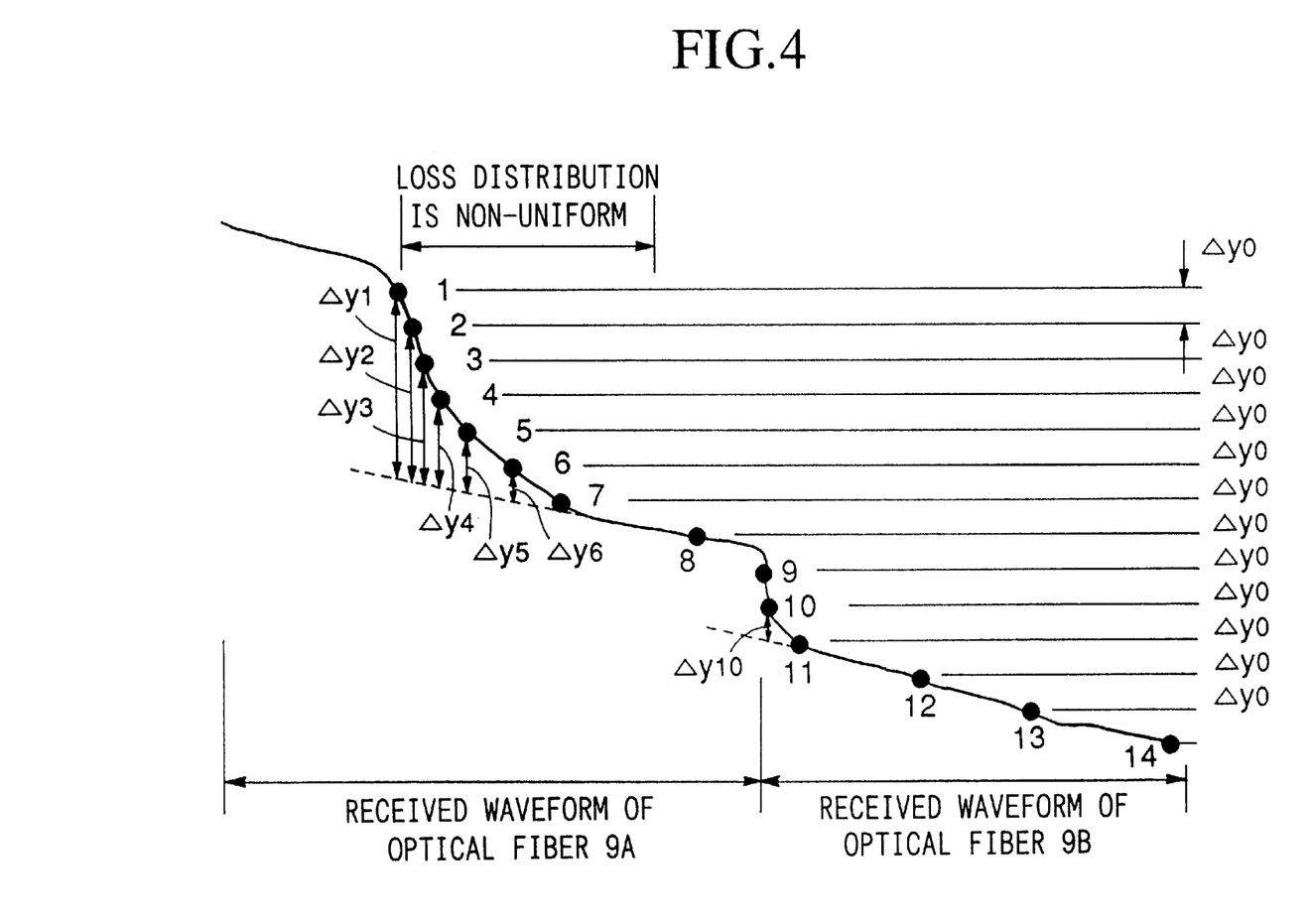
FIG. 4 is a graph showing how to set a criterion $\Delta y0$ on a signal waveform received by an embodiment of the present invention.

In a similar manner, data points are set as data point 2, data point 3, . . . where the intensity of received signal changes every 0.1 dB of $\Delta y0$ along the optical fiber 9 to be tested, starting from data point 1 on the signal waveform, and the data between every point is stored (step Sa3). FIG. 4 is a graph showing the setting of a criterion $\Delta y0$ on a received signal waveform.

Next, fixed value (for example $\Delta y1$, between data point 1 and data point 2: refer to FIG. 4) is added, as explained below, to each point between a certain data point n set at the step Sa3 and adjacent data point n+1 (step Sa4). Generally, the degree of attenuation (attenuation characteristics) in the optical fiber is defined by a standard of the optical fiber. As an example, loss when a light of 1.55 $\mu$m passes through a single-mode fiber is 0.2 dB per 1 km.

In this case, a distance between data of $\Delta y0=0.1$ dB is 500 m if loss distribution is uniform. For this reason, a case when a distance between every two data points is less than 500 m is considered as having a rapid changing of loss in this zone. Also, the inclination which is observed depending on the light pulse width of OTDR, changes, and a step results, at the connecting point of optical fiber 9A and optical fiber 9B. A place at which an inclination changes and a step occurs is defined as a spatial resolution near the no-reflection connection point, by Japanese Industrial Standard C6185-1995. In general in an OTDR, the spatial resolution is approximately 15 m when a pulse width of light to be measured is 100 nsec.

Accordingly, if distances between data for every $\Delta y0=0.1$ dB are less than 20 m, a loss is judged to be one soon after connection loss, not a waviness of loss distribution in the optical fiber. In the embodiment of the present invention, a fixed value is added when distances of data for every $\Delta y0=0.1$ dB are larger than 20 m and less than 250 m.

Figure 5:
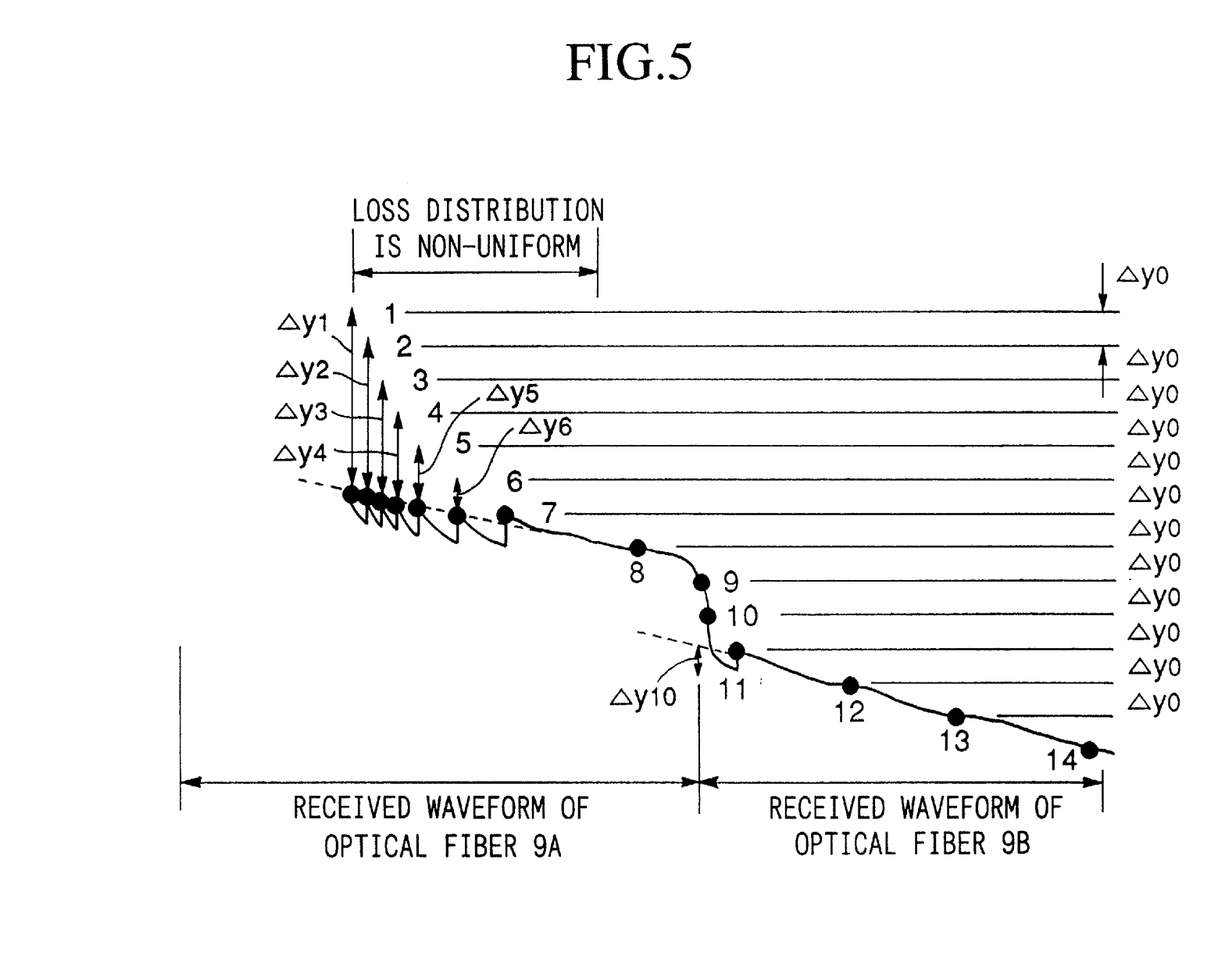
FIG. 5 is a graph showing the waveform after adding fixed values on each period of the waveform shown in FIG. 2 and FIG. 4.

FIG. 5 shows a waveform after adding fixed values to waveforms shown in FIG. 2 or FIG. 4 for every term. Addition of fixed values for optical fiber 9A and optical fiber 9B based on FIG. 2 is explained below. Herein, discussion is on the period between data point 1 and data point 8, where an interval between data grows to be over 250 m and then diminishes below 250 m.

First, a dotted line is drawn with a loss of 0.05 dB per 250 m starting at data point 8, and differences between a dotted line and data points are added for every data period. For example, if a difference between a dotted line and data point 1 is $\Delta y1$, $\Delta y1$ is added to a waveform between data point 1 and data point 2. In FIG. 2, the difference is negative, and a negative value is added. Consequently, it shows a waveform where characteristics are moved downward.

In a similar manner, a difference, between a dotted line and data point 2, $\Delta y2$ is added to a waveform between data point 2 and data point 3. The process proceeds to add $\Delta y6$ to a waveform between data point 6 and data point 7. However, a fixed value is not added to a waveform between data point 7 and data point 8, because the distance between data measurement point is larger than 250 m. Also, no fixed value is added to a waveform between data point 8 and data point 9, because a distance between data measurement point is less than 20 m.

A fixed value for the optical fiber 9B is discussed for data points which are on the left side of a period where, starting at data point 9, the distance between data goes over 250 m and then below 250 m again. However, the discussion relates to the period on the right side of data point 14 because there is no corresponding part in FIG. 4.

First, a dotted line is drawn starting at the data point 14 as the loss is 0.05 dB per 250 m, and differences between a dotted line and data points are added for every data period. However, no fixed value is added to a waveform between data point 8 and data point 9, because a distance between data is less than 20 m. A difference Δy10 between a dotted line and data point 2 is added to a waveform between data point 10 and data point 11. Furthermore, no fixed value is added to the waveform between data point 11 and data point 14, because a distance between data is over 250 m.

Thus, fixed values appropriate to the loss in each period are added to the period where a loss changes rapidly after OTDR operation, to be equal to the original loss distribution of the optical fiber. Next, data after fixed values are added at every period in the waveform shown in FIG. 4 are replaced as new data of this period (step Sa5), and a waveform shown in FIG. 5 is treated as new waveform of the signal.

Figure 6:
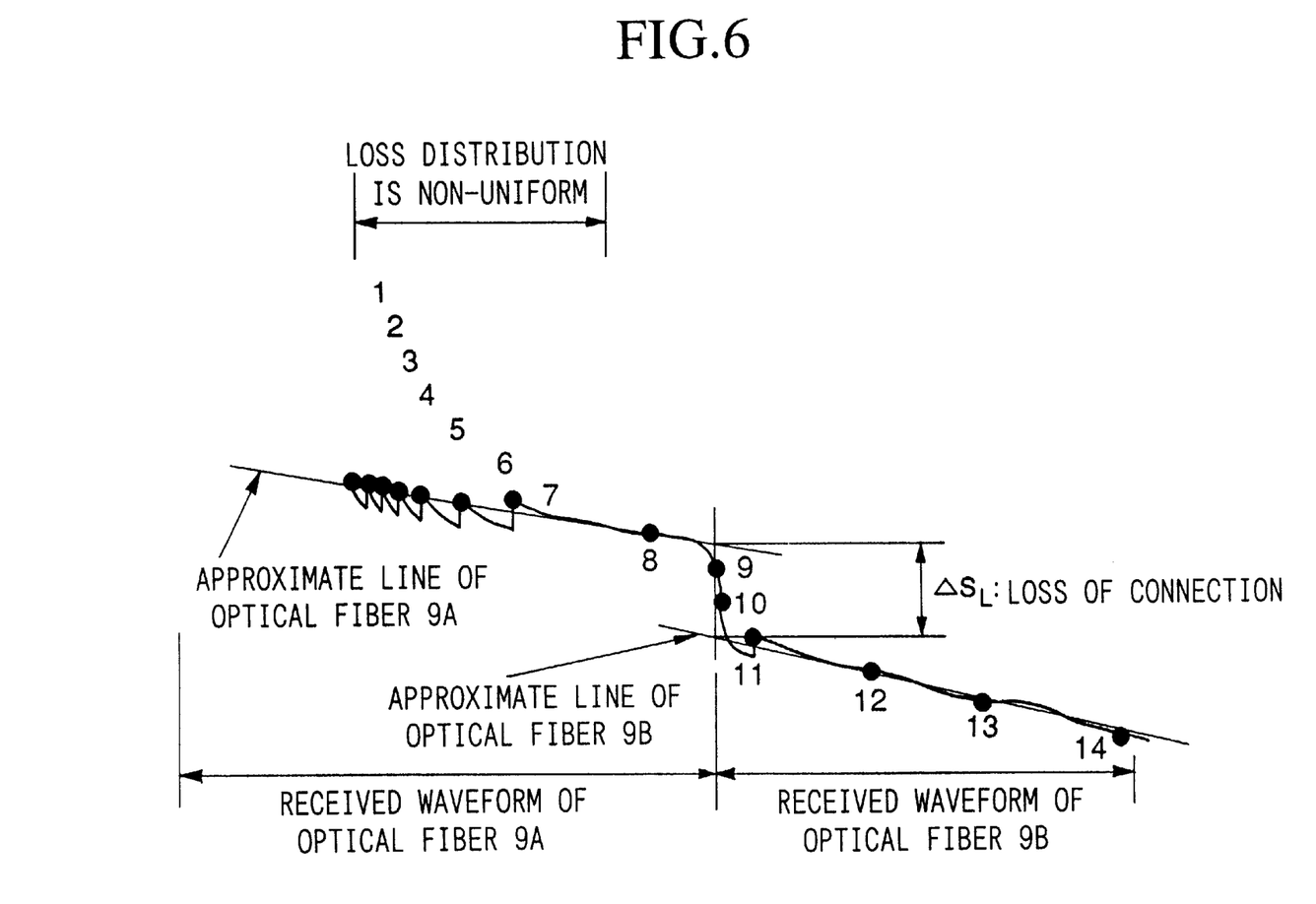
FIG. 6 is a graph superimposing two square approximate straight lines on a waveform with added fixed values in an embodiment of the present invention.

Here, the linear regression line using the method of least square y=a1x+b1 is calculated by using the data in the period of optical fiber 9A selected from the new waveforms prepared in the above mentioned step Sa5. Also, the linear regression line using the method of least square y=a2x+b2 is calculated by using the data in the period of optical fiber 9B (step Sa6). FIG. 6 is a graph superimposing two linear regression lines y=a1x+b1 and y=a2x+b2 on a waveform with added fixed values.

Afterward, the criterion for the difference of the above two linear regression lines is set at the connecting point of optical fiber 9A and optical fiber 9B (step Sa7). Further, in this embodiment of the present invention, the criterion is set to 0.2 dB as loss distribution is assumed to be 0.2 dB.

Judgement is performed whether or not the loss value by connection (refer to FIG. 6) calculated based on the linear regression line using the method of least square made in above step Sa7 is larger than the criteria set in above step Sa7. Also, each data point which is larger than the criteria is judged as being non-continuous in the optical fiber to be tested (step Sa9).

For example, $\Delta S_L$ represented in FIG. 6 is a loss by connection calculated above. That is, in step Sa8, if $\Delta S_L$ is larger than 0.2 dB set in above step Sa7, it is judged in step Sa9 that non-continuous point exist and it corresponds to the data point 8.

Thus, by an embodiment of the present invention, it is possible to provide a testing method for an optical fiber, which automatically detects a trouble point and measures the loss at the connection point using an OTDR method, even in the case when the loss distribution of the optical fiber is non-uniform and the measured curve is not linear after logarithmic conversion is performed on the change in level of the received signal.

What is claimed is:

1. A testing method for an optical fiber, to measure a loss distribution and a loss at a connection point based on a received first light signal waveform, the method comprising:

extracting and storing the duration of the first light signal waveform when the difference of the level between the start and the end of the waveform from a specified starting point exceeds a specified criterion;

generating a second light signal waveform by adding fixed values corresponding to each duration obtained by the act of extracting;

judging if a value of connection loss calculated using the first light signal waveform exceeds the specified criterion; and deciding that a point exceeding the criterion specified above is a discontinuous point existing in the optical fiber to be tested.

2. The method of claim 1, further comprising:

specifying the starting point of detection of transition of the first light signal waveform.

3. The method of claim 2, further comprising:

specifying the criterion of transition of the first light signal waveform.

4. The method of claim 3, further comprising:

calculating the linear regression line using the method of least square of the second light signal waveform.

5. The method of claim 4, further comprising:

setting the criterion based upon the difference of the level at the connection point generated by the approximate line.

6. The method of claim 4, wherein the linear regression line using the method of least square is obtained as two linear regression lines using the method of least square divided at a border point exceeding the specified criterion.

7. The method of claim 5, wherein the difference of the level is obtained from two linear regression lines using the method of least square at the point exceeding the specified criterion for the second light signal waveform.

* * * * *